Nov. 20, 1934.  F. A. FIRESTONE ET AL  1,981,693
GEAR TESTING APPARATUS
Filed Oct. 24, 1929  2 Sheets-Sheet 1
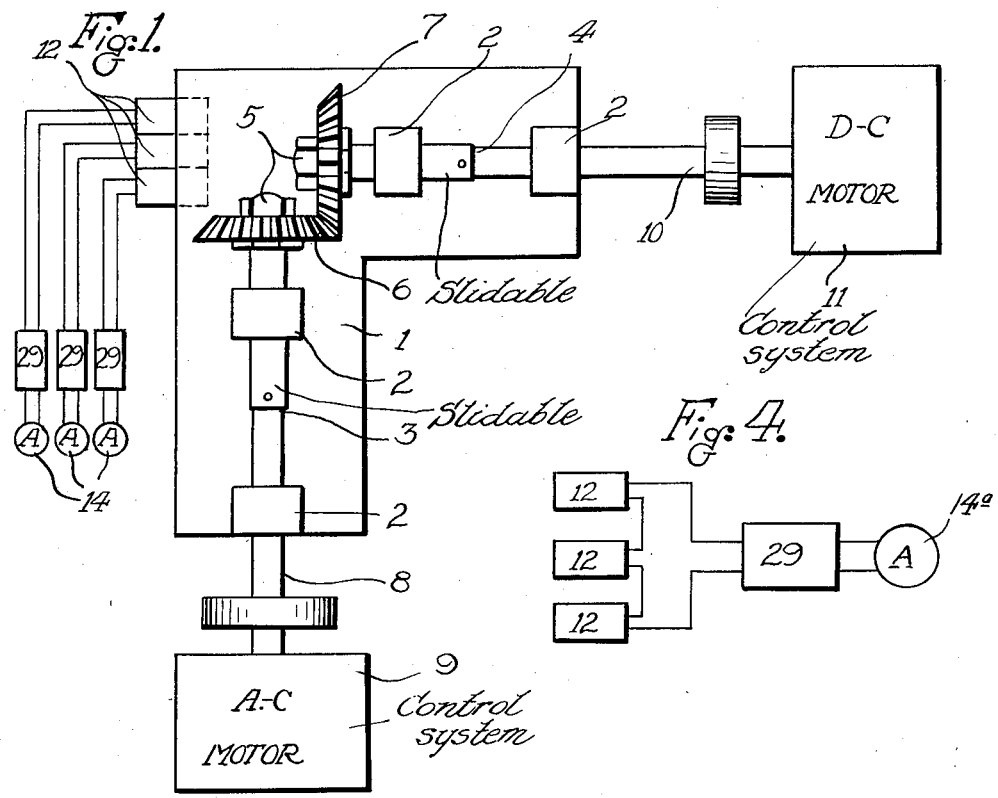
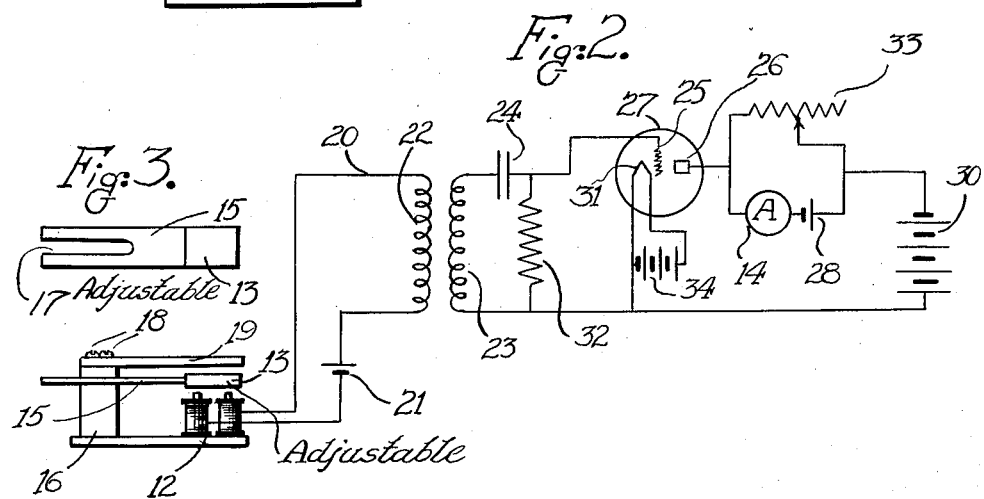
INVENTORS
Floyd A. Firestone
Ernest J. Abbott and
Howard B. Vincent
by
THEIR ATTORNEYS

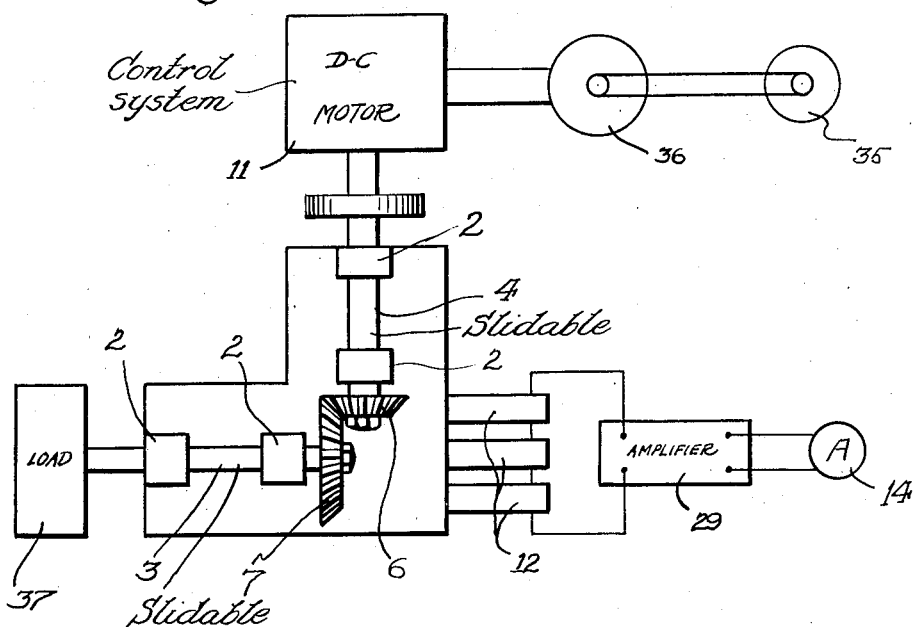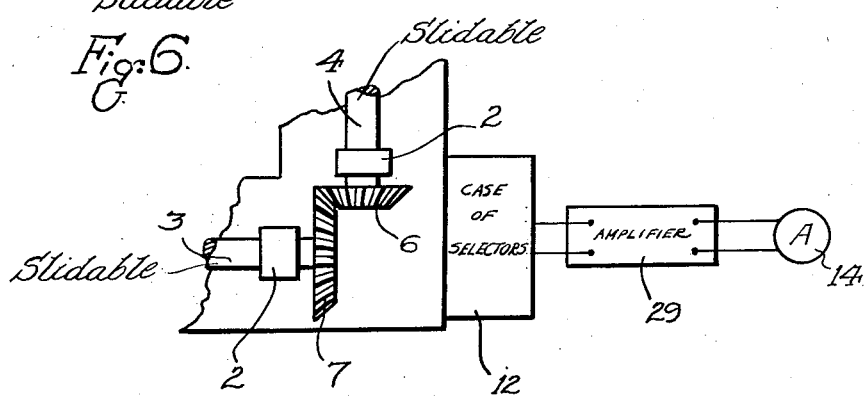

Patented Nov. 20, 1934

1,981,693

UNITED STATES PATENT OFFICE 1,981,693

GEAR TESTING APPARATUS

Floyd A. Firestone, Ernest J. Abbott, and Harvard B. Vincent, Ann Arbor, Mich.

Application October 24, 1929, Serial No. 402,260

7 Claims. (Cl. 73—51)

This invention relates to apparatus for inspecting gears, roller bearings and other mechanical devices that give off musical notes. One of the principal objects of the invention is to devise apparatus that will pass only such gears as meet certain requirements and will indicate with respect to the others the probable changes needed to make them passable. Another object is to measure or indicate the intensity of vibration of such devices. The invention comprises one or more vibration responsive devices within range of influence of a running gear set or other source of mechanical vibration and electro-magnetic means actuated by such sound-responsive devices for indicating the intensity of the vibrations emitted by such gear set. It also consists in apparatus for running the gear set, bearing or other source of vibration at constant speed to insure continuance of the same musical note. It also consists in the apparatus and in the parts and combinations hereinafter described and claimed.

In the accompanying drawings which form part of this specification and wherein like symbols refer to like parts wherever they occur, Fig. 1 is a diagrammatic view of apparatus embodying our invention, Fig. 2 is a diagrammatic view of one of the vibration responsive devices together with a system for amplifying and indicating the electromotive forces generated therein, Fig. 3 is a detail view showing a reed with an elongated slot to permit longitudinal adjustment thereof, Fig. 4 is a diagrammatic view showing three sound responsive devices operatively connected to a single indicating device, Fig. 5 is a diagrammatic view of variable speed apparatus; and Fig. 6 is a detail view showing a modification of the arrangement illustrated in Fig. 5.

In the accompanying drawings, 1 designates the frame of a test stand having journal bearings 2 for two horizontal shafts 3, 4 that are mounted at right angles to each other. The adjacent ends of these shafts are adapted to receive the respective bevel gears 6, 7 of a set and are provided with means such as nuts 5 working on the threaded ends of the shafts for locking said gears in place, likewise, in order to adapt said apparatus for testing gears of different sizes and to run the gears in best adjustment, the two shafts or, at least, the portions that support the gears are slidable longitudinally.

The shaft 3 is coupled to the armature shaft 8 of a synchronous constant speed alternating current motor 9, and the other shaft 4 is coupled to the armature shaft 10 of a direct current motor 11. Suitable wiring and control systems are used in connection with said motors; but as such systems are well known and form no part of our invention, they are omitted from the accompanying drawings.

As such apparatus is well known, it is believed only necessary to state that under normal conditions, the circuit of the alternating current motor is open, by pushing a starting button in the alternating current circuit, the circuit of an automatic starter is closed to energize said starter, which starts the alternating current motor, leaving said motor in operation to drive the shaft 3 forwardly. At the same time that the alternating current motor is started, the starting button is arranged to energize the operating coil of a magnetically operated switch, which switch makes the necessary connections to use the direct current motor as a generator, the output of which is absorbed in a suitable resistor; and by pushing another button (called the "coast button") the alternating current motor is started as described above, and at the same time the operating coil of another magnetically operated switch is energized, which switch connects the direct current motor to a power line and drives the gears forwardly from the gear shaft, the alternating current motor acting as a synchronous brake on the pinion shaft.

When two intermeshing gears are run together, they give off a musical note corresponding to the number of contacts per second that their teeth make with one another; and, so long as the gears are driven at a constant speed, the musical note emitted thereby remains constant. Not only do the gears give off a definite musical note, but they also emit notes that are higher harmonics of such fundamental note. According to the present invention, the intensities of such fundamental and harmonic notes are indicated by suitable apparatus and are used as a guide for correcting and finishing the gears.

Such apparatus comprises sound or vibration responsive devices 12 located close enough to the gear set under test to respond to the sound emitted thereby. Each of such devices comprises an electromagnet 12a with a suitable armature 13 tuned or tunable to respond to the fundamental note emitted by the gear when run at a predetermined constant speed. The coils of said electromagnet are hooked up through a suitable amplifying system 29 to the circuit of an electrical indicator 14. Other sound responsive devices are tuned respectively to higher harmonics of said fundamental note. By this arrangement the intensities of the fundamental note and the higher harmonics thereof are indicated visually, audibly or otherwise.

A suitable vibration responsive apparatus is illustrated in Fig. 2. In this figure, the armature is shown as a piece of soft iron 13 located opposite the poles of the horse shoe electromagnet and mounted on the end of an elongated flat spring 15 that is mounted on the same base with the electromagnet. Said spring thus constitutes a reed, and the effective length thereof may be varied either by adjusting the position of the iron thereon or by sliding the reed endwise on the mounting block 16. Such adjustment may be readily provided for by making a longitudinally elongated slot 17 in the end portion of the reed for the clamping screws 18 to pass through. In order to dampen the vibration of said reed a heavy plate 19 is mounted on said mounting block parallel with it; that is, the reed armature is located between the electromagnet and said plate with air spaces intervening. Thus, when the gear gives off a musical note, the reed armature, which is tuned to vibrate therewith, vibrates in front of the electromagnet and thereby generates an alternating electric current in the circuit 20 thereof. Obviously, if desired, the damping plate 19 may be omitted.

This circuit 20 comprises a battery 21 and the primary coil 22 of a transformer. The secondary coil 23 of said transformer is in a circuit which contains in sequence, a condenser 24, and a grid leak 32. The grid 25 and the filament 31 which comprise the input terminals to the vacuum tube 27 are connected across the grid leak 32, and the filament 31 is heated by the A battery 34. The output circuit of the vacuum tube 27 contains the plate 26, a B battery 30, and a combination of a small battery 28, and indicating device 14 in parallel with a variable resistor 33. The variations of electromotive force generated by the vibration of the armature are amplified and its intensity indicated on the indicating device. Such indicating device is preferably a milliammeter so connected that it reads zero when there is no noise, and preferably its dial has only one mark, namely the passing mark. If the hand swings beyond the passing mark, the gear is rejected and returned for correction.

As above stated, one reed is tuned to respond to the fundamental musical note given off by the gear set under test; and other reed armatures are tuned to the higher harmonics of said note. While Fig. 1 shows a separate indicating device 14 for each vibration responsive device, it is practicable to connect two or more vibration microphones to the input of a single amplifier and thus obtain the readings on a single indicating meter as shown in Fig. 4. In some cases as where there are two or more gear sets running simultaneously with different pitches, it is desirable to have separate vibration responsive apparatus for each gear set.

When a single gear is to be tested, it is mounted on one or the other of the shafts and a mating or master gear is mounted on the other shaft, and the shafts adjusted to bring said gears into mesh. Then the starting button is pushed to energize the starter and thereby start the constant speed alternating current motor. Under this condition, the alternating current motor drives the shaft 3 and the pinion or gear thereon at a constant speed and this motion is transmitted through the meshing gears to the shaft 4 and to the pulley and belt thereon to the armature shaft of the direct current motor, which thus serves as a load for the alternating current motor. This condition simulates the practical operation of the gear set on direct drive; and if the gears fully meet requirements, the noise emitted thereby will be of such feeble intensity that the hands of the electric indicating devices will remain below the passing limit marked thereon. If, however, the hand of either of the indicators swings beyond the passing limit, the gears are removed from the test stand for examination and correction.

One of the regular conditions of service is that commonly referred to as "coasting"; by which is meant the condition that exists when the driven gear continues to rotate forwardly and load is applied to the shaft which formerly supplied power. This condition is simulated in the present apparatus by closing the circuit of the direct current motor to drive the same forward, that is, in the same direction in which it was driven by the alternating current motor, the gears and all connections remaining as before. In this condition, the shaft 4 is driven forwardly by the direct current motor and through the intermeshing gears, the shaft 3 and the alternating motor are likewise driven forwardly, the alternating current motor functioning in this case as a load on the direct current motor and insuring the constant speed required to produce and maintain the desired fundamental note. This operation of "coasting" affects different tooth surfaces from those affected by direct drive; but otherwise the operation is like that of direct drive.

Thus far we have been dealing with the operation of inspecting gears or gear sets in a test stand, wherein the gear or gear set may be mounted and caused to produce a predetermined or readily determinable musical note. Obviously, however, the invention is applicable to the inspection of gears already installed in machinery and running at their regular service speeds. In such case, the test stand and the apparatus for running the gears at constant speed are unnecessary, because their principal function is to cause the gears to give off a musical note, whereas the gears of running machinery give off musical notes spontaneously. In this latter case, nothing more is needed than suitable vibration responsive devices together with suitable means for amplifying and indicating the results. So long as the machinery is run at constant speed, the musical note given off by any particular set of gears remains constant and the vibration responsive devices to be used therewith should have reeds of the same natural frequency of vibration as said musical note and its higher harmonics respectively. In order to avoid the necessity for an undue multiplicity of vibration responsive devices, the reeds may be made adjustable so as to change their natural frequencies and thus enable them to be tuned into resonance with the gear notes and harmonics thereof. In practice, it is only necessary to locate the vibration responsive devices within the range of influence of the musical note emitted by the machinery under test; and the entire vibration responsive and indicating apparatus is small enough to be easily carried from place to place as desired.

While the foregoing description deals with the inspection of gears either in course of manufacture or in practical use, it is obvious that there are other devices that give off definite musical notes, such as roller bearings, electric motors and other parts that run at constant speed or vibrate at definite frequencies, and the invention hereinbefore described is obviously applicable to the inspection of such devices.

In addition to the constant speed arrangement for measuring notes described above, the inventors have made use of a combination using variable speed. In the diagrammatic arrangement illustrated in Fig. 5 a small motor 35 is connected to, and drives a field rheostat 36 to control the speed of the direct current motor 11. The magnitude of the speed change is determined by the change of field current, and the speed change is determined by the speed at which the field rheostat 36 is driven. Thus a convenient automatic cycle of acceleration and deceleration is obtained.

The direct current motor 11 drives the shaft 4 which in turn drives the shaft 3 through the gears 6 and 7 to be tested, the said shaft 3 drives a generator or load 37.

The purpose of the variable speed is to bring the various notes that it is desired to measure into tune with one or more sound or vibration selective devices 12 placed on the machine. Figs. 5 and 6 show two arrangements of using the selectors.

Fig. 5 shows an arrangement for measuring a given note, say the fundamental gear note at several speeds. Suppose for example, that at 1000 R. P. M. the note has a frequency of 200 cycles, then at 1500 R. P. M., and 2000 R. P. M. its frequency will be 300 and 400 cycles, respectively. If it is desired to measure the intensity at these three speeds it is only necessary to use three different selectors which are tuned respectively to the desired frequencies and to connect them all in series to the input of an amplifier-indicator system. The note will be measured at each of the speeds in turn as the proper selector comes into tune.

Fig. 6 shows an arrangement by which the variable speed mechanism can be used to measure all the notes in a given frequency range without regard to their exact pitch. Suppose, for example, that the speed is to be varied over a range of two to one, and that it is desired to measure all the notes produced by both gears and bearings whose frequencies lie between 100 and 800 cycles at the slowest speed. In order to do this it is only necessary to have three tuned selectors of frequencies 200, 400, and 800 cycles, respectively. All notes that lie between 100 and 200 cycles at the slowest speed must come into tune with the first selector during the cycle of operation, those between 200 and 400 with the second, and those between 400 and 800 with the third. If desired, these selectors can be connected to different amplifier-indicators; or they may all be connected in series and connected to a single amplifier-indicator as shown in Fig. 6. Each note will be indicated when it comes in tune with the proper selector.

Obviously the apparatus hereinbefore described admits of considerable variation without departing from our invention.

What we claim is:

1. Apparatus for testing gear sets and the like comprising driving and driven shafts adapted to carry the respective gears, means for driving the gear set at a constant speed to produce a fundamental musical note, a plurality of vibration responsive devices within range of said gear set, and indicating devices to which said vibration responsive devices are respectively operatively connected to operate the same, each of said vibration responsive devices comprising an electromagnet whose armature comprises a vibratile reed, the natural frequency of vibration of one armature being that of said fundamental note, and the frequency of another armature being a harmonic thereof, said driving means comprising a constant speed synchronous alternating current motor for the driving shaft and a direct current motor for the driven shaft and means for energizing said motors alternately.

2. Apparatus for testing gears comprising a generator, a direct current motor, means for securing two intermeshing gears to the generator and the motor respectively, a field rheostat driven by a small motor, said field rheostat being operatively connected with the direct current motor to control the speed thereof, a plurality of vibration responsive devices, and indicating devices to which said vibration responsive devices are respectively operatively connected to operate the same, said vibration responsive devices being located within the range of influence of said gears.

3. Apparatus for testing comprising a constant speed alternating current motor, a direct current motor, means for selectively energizing either motor, means for securing intermeshing gears operatively to said motors respectively, so that each motor serves as a loading generator while the other motor is driving, a plurality of vibration responsive devices located within the range of influence of said gears and indicating devices to which said vibration responsive devices are connected to operate the same.

4. Apparatus for testing gears comprising two rotatable shafts adapted to receive two intermeshing gears respectively, a constant speed alternating current motor operatively mounted to drive one of said shafts, a direct current motor operatively mounted to drive the other shaft, selective means for energizing either motor, a plurality of vibration responsive devices located within the range of influence of said intermeshing gears, and indicating devices to which said vibration responsive devices are operatively connected to operate the same.

5. Apparatus for testing gears comprising two rotatable shafts adapted to receive two intermeshing gears respectively, a constant speed alternating current motor operatively mounted to drive one of said shafts at predetermined speed and a direct current motor operatively mounted to drive the other shaft, means for selectively energizing either motor, said motors having their armature shafts mechanically connected through said gears so that each motor functions as a loading generator when the other motor is driving, and each motor being arranged to turn the shafts in the same direction that the other motor turns them, a plurality of vibration responsive devices located within the range of influence of said intermeshing gears, and indicating devices to which said vibration responsive devices are operatively connected to operate the same.

6. Apparatus for testing comprising two shafts each having means for securing a gear thereto and the two shafts being arranged to permit such gears to intermesh, a synchronous alternating current motor, a direct current motor, one of said shafts being operatively connected to said synchronous alternating current motor to be driven thereby and the second shaft being operatively connected to said direct current motor to be driven thereby, whereby each motor acts as a load while the other is driving, each motor running in the same direction when driving as when driven, a plurality of vibration responsive devices located within the range of influence of said intermeshing gears, and indicating devices to which said vibration responsive devices are operatively connected to operate the same.

7. Apparatus for testing comprising two shafts each having means for securing gears thereto and arranged to permit such gears to intermesh, a synchronous alternating current motor, a direct current motor, one of said shafts being operatively connected to said synchronous alternating current constant speed motor to be driven thereby and the second shaft being operatively connected to said direct current motor to be driven thereby in the same direction that it is driven by said first mentioned shaft, controlling means for selectively energizing either motor and said motors being connected together in such manner that each acts as a load while the other is driving, a plurality of vibration responsive devices located within the range of influence of said intermeshing gears, and indicating devices to which said vibration responsive devices are operatively connected to operate the same.

FLOYD A. FIRESTONE.
ERNEST J. ABBOTT.
HARVARD B. VINCENT.